(12) United States Patent
Greco et al.

(10) Patent No.: US 8,122,300 B2
(45) Date of Patent: Feb. 21, 2012

(54) NON-VOLATILE REDUNDANT VERIFIABLE INDICATION OF DATA STORAGE STATUS

(75) Inventors: Paul Merrill Greco, Tucson, AZ (US); Glen Alan Jaquette, Tucson, AZ (US); Paul J Seger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/703,499

(22) Filed: Feb. 10, 2010

(65) Prior Publication Data

US 2011/0197100 A1      Aug. 11, 2011

(51) Int. Cl.
*G06F 11/00*      (2006.01)

(52) U.S. Cl. ............................................. 714/54; 714/21

(58) Field of Classification Search ................ 714/19–21
See application file for complete search history.

(56) References Cited

U.S. PATENT DOCUMENTS

| 5,481,699 | A  | * | 1/1996  | Saether ........................... 714/15 |
| 5,802,583 | A  |   | 9/1998  | Yeager et al. ................. 711/152 |
| 5,852,534 | A  |   | 12/1998 | Ozue et al. ...................... 360/69 |
| 6,424,478 | B2 |   | 7/2002  | Hamai et al. .................... 360/48 |
| 6,535,344 | B1 |   | 3/2003  | Takayama ....................... 360/60 |
| 6,674,596 | B1 |   | 1/2004  | Takayama ....................... 360/69 |
| 2003/0235000 | A1 |   | 12/2003 | Takayama ....................... 360/69 |
| 2005/0246136 | A1 | * | 11/2005 | Topham ......................... 702/187 |
| 2007/0271472 | A1 |   | 11/2007 | Grynberg ........................ 713/193 |
| 2008/0313155 | A1 |   | 12/2008 | Atchison et al. .................. 707/3 |
| 2009/0157989 | A1 | * | 6/2009  | Karamcheti et al. .......... 711/156 |

OTHER PUBLICATIONS

Sony Product Specification manual for SDX-900V, Version 2.1, Jul. 2005, Appendix E: Medium Auxiliary Memory.*

* cited by examiner

*Primary Examiner* — Robert Beausoliel, Jr.
*Assistant Examiner* — Neil Miles
(74) *Attorney, Agent, or Firm* — John H. Holcombe

(57) ABSTRACT

A non-volatile redundant verifiable indication of data storage status is provided with respect to data storage operations conducted with respect to removable data storage media, and store the indication with an auxiliary non-volatile memory of the data storage media, such that the indication stays with the media. At least one state value indicating the status of the data storage operation is written to one page of the auxiliary non-volatile memory, and a redundancy check is provided with respect to at least the written state value of the one page of the auxiliary non-volatile memory; and the same state value is written to a second page of the auxiliary non-volatile memory, and a redundancy check is provided with respect to at least the written state value of the second page of the auxiliary non-volatile memory. The redundancy checks indicate the validity of the state values.

9 Claims, 5 Drawing Sheets

NON-VOLATILE REDUNDANT VERIFIABLE INDICATION OF DATA STORAGE STATUS

FIELD OF THE INVENTION

This invention relates to data storage, and more particularly to the storage of data with respect to data storage media having auxiliary non-volatile memory.

BACKGROUND OF THE INVENTION

Data storage operations, for example, with respect to data storage media such as magnetic tape data storage cartridges, can become complex, comprising multiple interleaved read and write functions, for example, to different data files stored at different locations. The operations are conducted by data storage drives in response to host commands. The data storage drives may be subject to possible sudden failure due to hardware, software or power events. Such an event may leave the data storage media in an unknown state, for example, at an intermediate point is a series of interleaved write/read functions. The data files may be inconsistent among themselves if at the point of failure some data files have been updated, while others have not. Tracking the operations by the data storage drives is not fail safe because the tracking information may be incomplete or corrupted during the failure event.

SUMMARY OF THE INVENTION

Methods, data storage drives, computer program products, and removable data storage media provide non-volatile redundant verifiable indication of data storage status with respect to data storage operations conducted with respect to removable data storage media, and store the indication with an auxiliary non-volatile memory of the removable data storage media, such that the indication stays with the media.

In one embodiment, at least one state value indicating the status of a data storage operation with respect to the removable data storage media, is written to one page of the auxiliary non-volatile memory of the data storage media, and a redundancy check is provided with respect to at least the written state value(s) of the one page of the auxiliary non-volatile memory. The state value(s) indicating the status of the data storage operation is also written to a second page of the auxiliary non-volatile memory, and a redundancy check is provided with respect to at least the state value(s) of the second page of the auxiliary non-volatile memory.

In a further embodiment, each state value represents an identification of a function in a sequence of functions of the data storage operation, and the state value is written to each page together with an identification of the data storage operation.

In another embodiment, the writing step comprises writing the state value(s) to the one page and to the second page of the auxiliary non-volatile memory as a "medium auxiliary memory" (MAM) attribute, and wherein the redundancy checks comprise a cyclic redundancy check (CRC).

In still another embodiment, additional steps comprise reading the written state value(s) of a data storage operation from the one page and from the second page of the auxiliary non-volatile memory; determining the validity of the redundancy check from each page; comparing the state value(s) of the one page to the state value(s) of the second page; and i. if the redundancy check from each page is valid, and the state value(s) from both pages are the same, return the state value(s) as the valid state value;

ii. if the redundancy check from each page is valid, and the state value(s) from each page is different, return the highest logical state value(s) as the valid state value;

iii. if the redundancy check from a page is valid, and the redundancy check from the other page is invalid, return the state value(s) from the valid page as the valid state value; and iv. if the redundancy check from each page is invalid, return no valid state value.

In a further embodiment, wherein the state values comprise (a) a value indicating rest status, and (b) other values of the data storage operation; additional steps comprise determining whether the returned valid state value indicates the rest status; and if so, indicating that data files of the removable data storage media with respect to the data storage operation are consistent; else, indicating an error with respect to the data storage operation.

In a still further embodiment, the indication of the error additionally comprises identifying the returned valid state value as the last completed status of the data storage operation.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
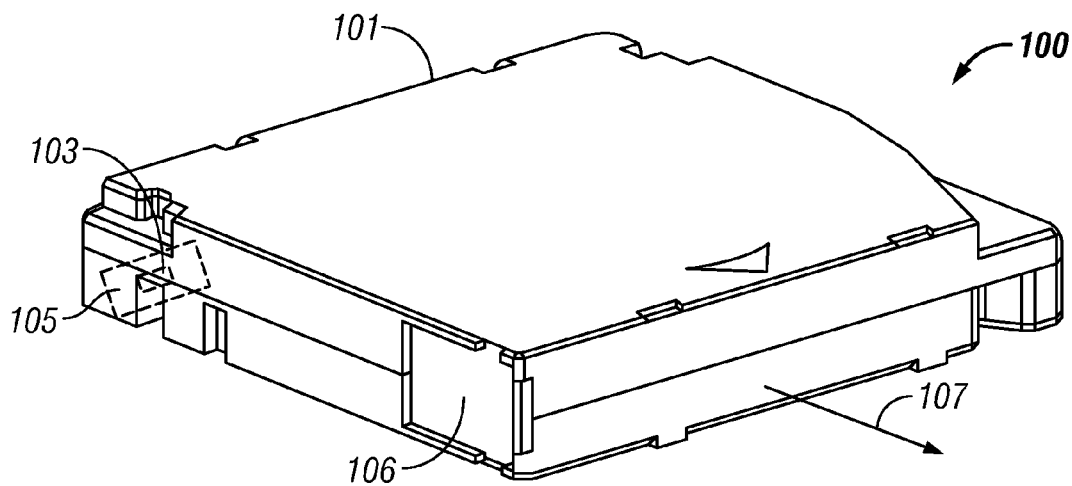
FIG. 1 is an illustration of a magnetic tape cartridge with an auxiliary non-volatile memory which implements the present invention.
Figure 2:
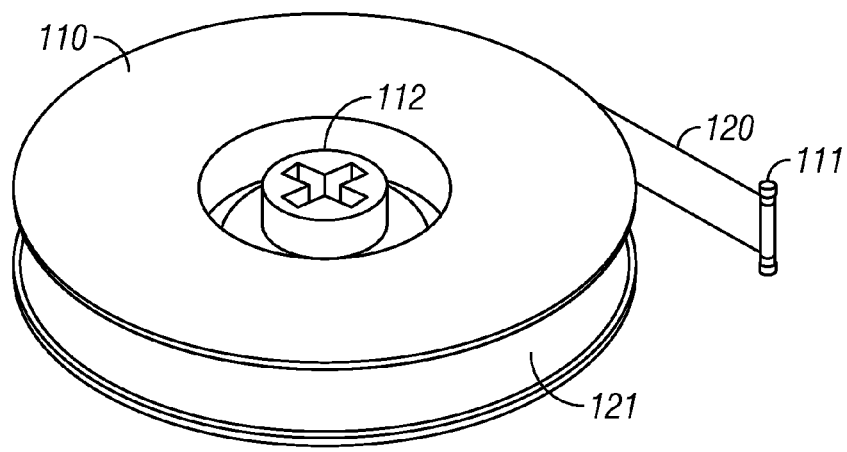
FIG. 2 is an illustration of a reel of magnetic tape of the magnetic tape cartridge of FIG. 1.

Referring to FIGS. 1 and 2, an example of removable data storage media, such as a magnetic tape cartridge 100, comprises a cartridge body 101, cartridge door 106 and an auxiliary non-volatile memory 103 on circuit board 105.

A data storage medium, comprising a rewritable magnetic tape 121, is wound on a reel 110, and a leader pin 111 is used to thread the magnetic tape 121 through the tape path of a magnetic tape drive. As is understood by those of skill in the art, a magnetic tape data storage cartridge comprises a length of magnetic tape wound on one or two reels, an example of which is those adhering to the Linear Tape Open (LTO) format. The illustrated magnetic tape cartridge 100 is a single reel cartridge. Magnetic tape cartridges may also comprise dual reel cartridges in which the tape is fed between reels of the cartridge.

In the tape cartridge 100, a brake button 112 is used to hold the tape reel 110 in place and to prevent it from rotating when tape cartridge 100 is not loaded in a tape drive. An optional tape leader 120 may be interposed between the leader pin 111 and the magnetic tape 121.

The auxiliary non-volatile memory 103, also called a cartridge memory (CM), for example, comprises a transponder having a contactless interface, which is retained in the cartridge 100, for example, by being encapsulated by the cartridge when it is assembled, as is understood by those of skill in the art. The auxiliary non-volatile memory is at an angle so that the auxiliary non-volatile memory can be accessed wirelessly by the magnetic tape drive.

The auxiliary non-volatile memory 103 typically stores information in protected pages and in unprotected pages that can be easily updated. Information stored in the unprotected pages includes mount information which is updated each time the cartridge is mounted in a magnetic tape drive and thereby tracks the number of times that a cartridge is mounted.

Figure 3:
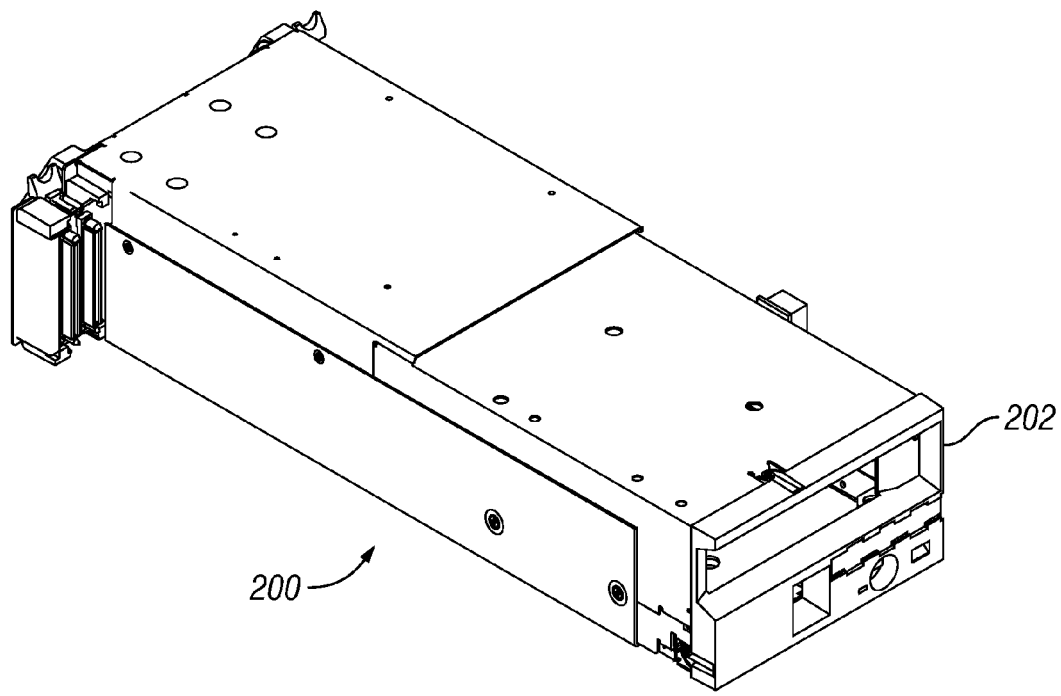
FIG. 3 is an illustration of a data storage drive which implements the present invention.
Figure 4:
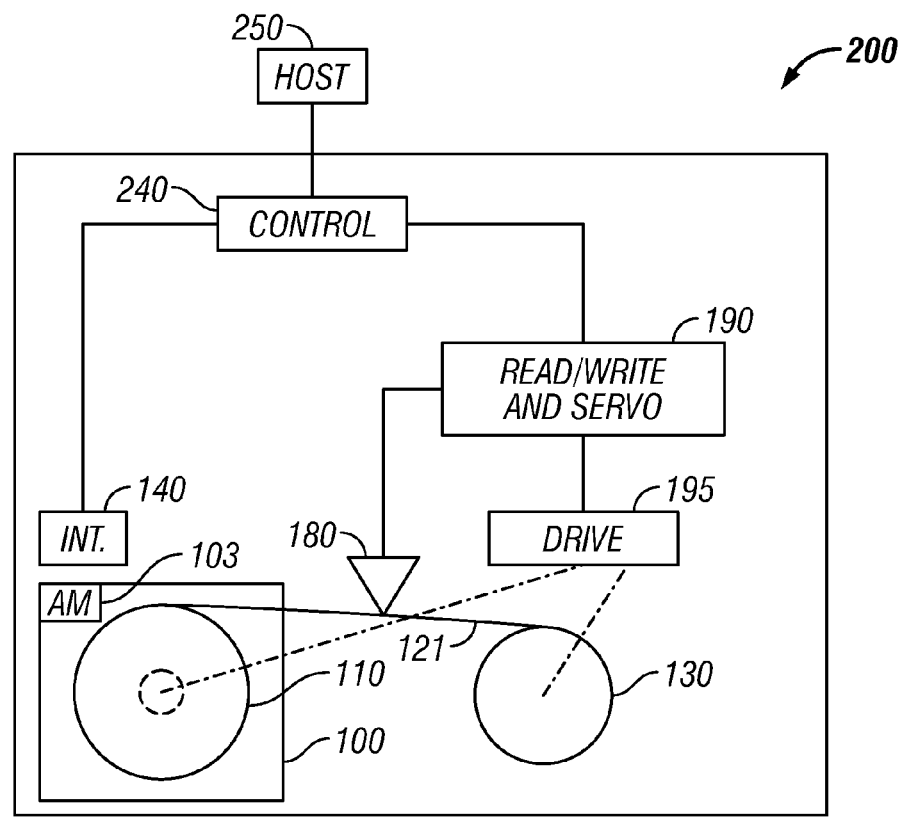
FIG. 4 is a block diagrammatic illustration of the data storage drive of FIG. 3.

Referring to FIGS. 3 and 4, a data storage drive, such as a magnetic tape drive 200, is illustrated. One example of a magnetic tape drive in which the present invention may be employed is the IBM 3580® Ultrium magnetic tape drive based on LTO technology, with microcode, etc., to perform desired operations with respect to the magnetic tape cartridge 100. A further example of a single reel magnetic tape data storage drive and associated cartridge is the IBM® 3592 TotalStorage Enterprise magnetic tape drive and associated magnetic tape cartridge. An example of a dual reel cartridge is the IBM® 3570 magnetic tape cartridge and associated drive.

Referring to FIGS. 1-4, in the instant example, the magnetic tape cartridge 100 is inserted into opening 202 of the magnetic tape drive 200 along direction 107, and loaded in the magnetic tape drive 200.

The magnetic tape is threaded and fed between the cartridge reel 110 and a take up reel 130 in the magnetic tape drive. Alternatively, both reels of a dual reel cartridge are driven to feed the magnetic tape between the reels.

The magnetic tape drive comprises a memory interface 140 for reading information from, and writing information to, the auxiliary non-volatile memory 103 of the magnetic tape cartridge 100, for example, in a contactless manner. A read/write system is provided for reading and writing information to the magnetic tape, and, for example, may comprise a read/write and servo head system 180 with a servo system for moving the head laterally of the magnetic tape 121, a read/write servo control 190, and a drive motor system 195 which moves the magnetic tape 121 between the cartridge reel 110 and the take up reel 130 and across the read/write and servo head system 180. The read/write and servo control 190 controls the operation of the drive motor system 195 to move the magnetic tape 121 across the read/write and servo head system 180 at a desired velocity, and, in one example, determines the location of the read/write and servo head system with respect to the magnetic tape 121. In one example, the read/write and servo head system 180 and read/write and servo control 190 employ servo signals on the magnetic tape 121 to determine the location of the read/write and servo head system, and in another example, the read/write and servo control 190 employs at least one of the reels, such as by means of a tachometer, to determine the location of the read/write and servo head system with respect to the magnetic tape 121. The read/write and servo head system 180 and read/write and servo control 190 may comprise hardware elements and may comprise any suitable form of logic, including a processor operated by software, or microcode, or firmware, or may comprise hardware logic, or a combination.

A control system 240 communicates with the memory interface 140, and communicates with the read/write system, e.g., at read/write and servo control 190. The control system 240 may comprise any suitable form of logic, including a processor operated by software, or microcode, or firmware, or may comprise hardware logic, or a combination, as discussed in greater detail hereinafter.

The control system 240 typically communicates with one or more host systems 250, and operates the magnetic tape drive 200 in accordance with commands originating at a host. Alternatively, the magnetic tape drive 200 may form part of a subsystem, such as an automated data storage library, and may also receive and respond to commands from the subsystem.

As illustrated, the control system 240 operates the magnetic tape drive 200 to perform operations in accordance with received commands. Examples comprise moving the tape to a desired location, reading data such as a file from the tape, writing data such as new data files to the tape, or appending new data to existing files or appending new data or data files to an existing data file of a partition, rewriting or appending indexes, etc. Certain information is also provided to auxiliary non-volatile memory 103.

As illustrated, the data storage drive, such as magnetic tape drive 200, provides information to, and reads information from, the auxiliary non-volatile memory 103 of the magnetic tape cartridge 100, and provides information to, and reads information from, the magnetic tape 121 of the magnetic tape cartridge 100.

Figure 5:
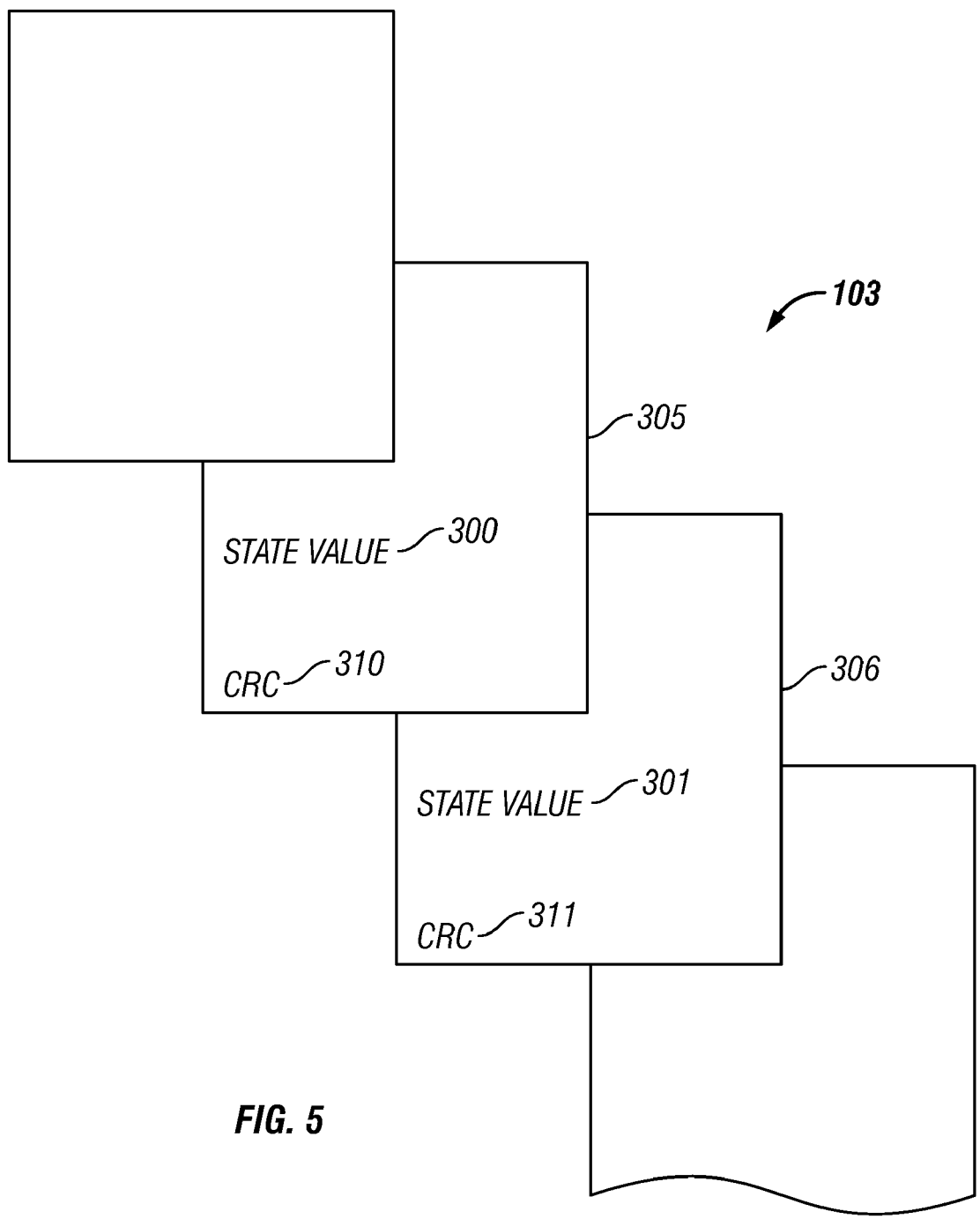
FIG. 5 is a diagrammatic illustration of a few pages of the auxiliary non-volatile memory of the data storage drive of FIGS. 3 and 4.

Referring to FIGS. 1, 2 and 5, the auxiliary non-volatile memory 103 is arranged in pages. As discussed above, data storage drive operations may be complex, such as many reads and writes and indexing with respect to the removable data storage media, and may be subject to sudden failure due to hardware, software or power events. At the point of failure, some data files may have been updated, while others involved in the same operation are unchanged or at a previous update level. The present invention provides non-volatile redundant verifiable indication of data storage status with respect to data storage operations conducted with respect to data storage media, such as magnetic tape cartridge 100, at magnetic tape data storage medium 121, storing the indication to an auxiliary non-volatile memory 103 of the removable data storage media 100. In one example, a state value 300 indicating the status of a data storage operation with respect to the data storage media 100, is written to one page 305 of the auxiliary non-volatile memory 103, and a redundancy check 310 is provided with respect to at least the written state value(s) of the one page 305 of the auxiliary non-volatile memory. In one embodiment, the redundancy check 310 is a cyclic redundancy check character calculated as known in the art with respect to the entire page 305. In another embodiment, the redundancy check comprises a check character calculated with respect to the written state value, perhaps together with a portion of other data of the page 305. The same state value indicating the status of the data storage operation is also written 301 to a second page 306 of the auxiliary non-volatile memory 103, and a redundancy check 311 is provided with respect to at least the state value(s) of the second page 306 of the auxiliary non-volatile memory.

Referring to FIGS. 4 and 5, the host system 250 identifies the state value, for example in the form of a "write attribute" command, with an Attribute ID, to control 240, which writes the state value, for example, as an update, via interface 140 to the auxiliary non-volatile memory 103, and recalculates the redundancy check, at one page 305, and at the second page 306. A "write attribute" command is a known command for a managed auxiliary non-volatile memory ("MAM"), typically used to control various aspects of the data storage drive or the data that is stored on the removable data storage media. The "MAM Attribute" identity (ID) may refer to a specific location of the memory. Alternatively, the host system 250 or control 240 may provide an identification of the data storage operation, which may identify a memory association that can be searched. A "read attribute" command is employed to read the stored attribute and thereby control various aspects of the data storage drive or the data that is stored on the data storage media. Instead, these commands may be employed in accordance with the present invention for storing and retrieving information at the auxiliary non-volatile memory 103, regarding the status of the operations conducted with respect to the removable data storage media. Those of skill in the art understand that various alternative commands and data storage drive operations may be employed for storing and retrieving information at the auxiliary non-volatile memory 103, regarding the status of the operations conducted with respect to the removable data storage media 100.

As the result of a failure of a data storage drive, the removable data storage media 100 is likely to be moved to an operational data storage drive.

At the operational data storage drive, the auxiliary non-volatile memory 103 of the removable data storage media 100 has the information necessary to determine the effect of the failure on the data of the removable data storage media. With the redundant verifiable state value, the point of a failure of the data storage drive is easily identified, unambiguous, and is fail safe, allowing rapid determination whether the data files are consistent.

Figure 6:
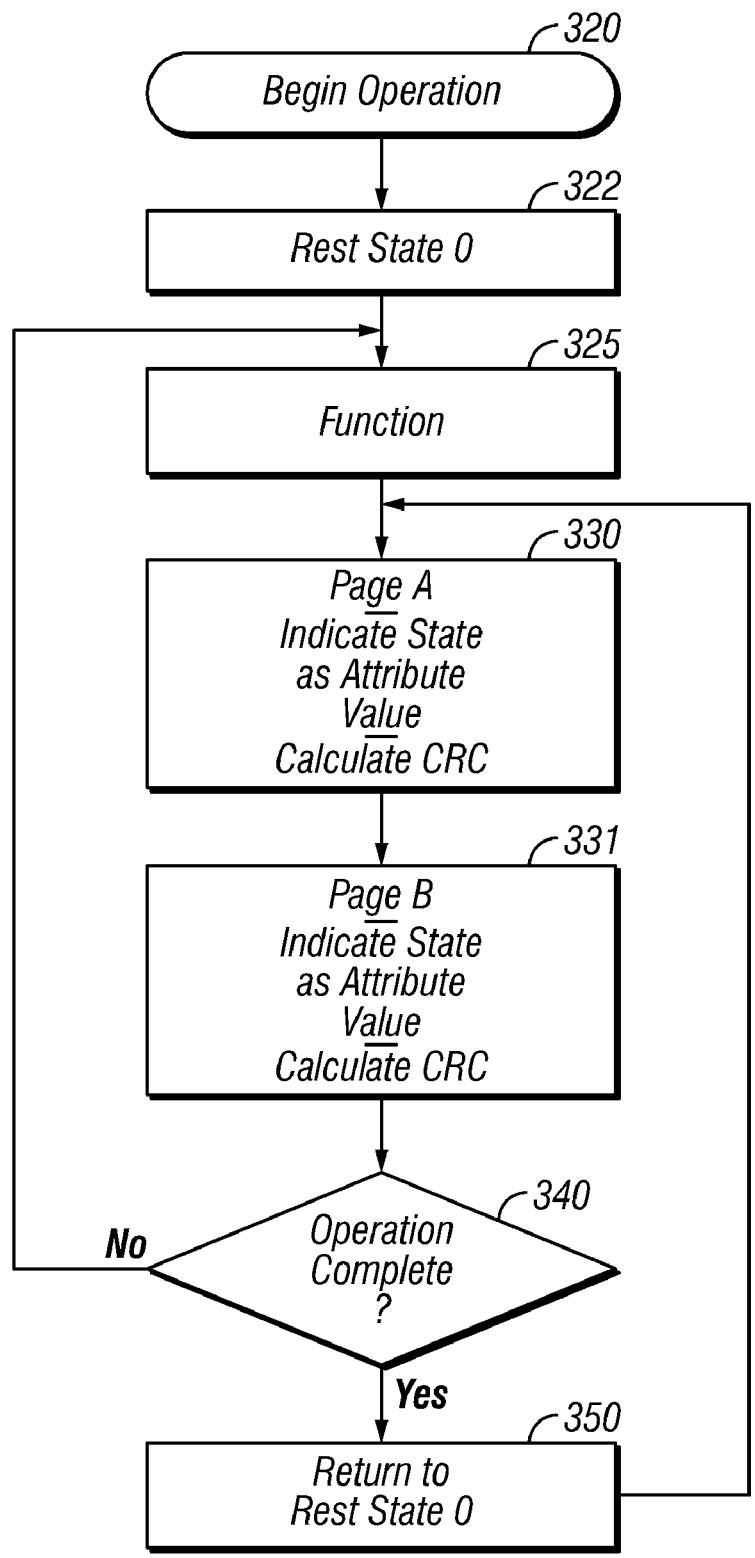
FIG. 6 is a flow chart depicting writing the states of an operation of the data storage drive of FIGS. 3 and 4 to the auxiliary non-volatile memory of FIG. 5.

FIG. 6 illustrates an embodiment for writing the state value to the auxiliary non-volatile memory. The complex operation is arranged as having various steps or functions (called functions herein to avoid confusion with steps of the embodiment) by the host or system conducting the complex operation. Each function is assigned a state value or set of values, which, for example, can be a numeric value that distinguishes the state. A complex operation may contain tens, hundreds, or thousands of states, which typically involve reading, writing and updating data files, more than once.

An example of a relatively simple complex operation and the assigned values comprises:

0 Rest state. No operation in progress. Previous operation completed successfully.
1 Begin operation.
2 Read last file (index) of tape partition 1.
3 Append short files to end of partition 1.
4 Append short and long files to end of partition 0.
5 Append index file to partition 0.
6 Append index file to partition 1.
7 Close operation.

Referring to FIGS. 5 and 6, the host system begins the complex operation at step 320, and the operation is at step "0", the rest state as shown by step 322. The host system identifies the operation so that the memory location or association can be identified, and the operation may already be in the rest state, and identified as such at both pages 305 and 306 of the auxiliary non-volatile memory 103. If the operation is new, the host system supplies the state value "0" indicating the status of the data storage operation with respect to the removable data storage media, and provides an identification of the operation, which in step 322, is written to the auxiliary non-volatile memory 103 by the data storage drive, as discussed above, and the redundancy checks calculated.

As the process proceeds through the complex operation, the host identifies the state or states of the operation, for example, the current function 325 of the operation, to the data storage drive. As discussed above, the state value may be identified by providing a "write attribute" command. In step 330, the control of the data storage drive writes the state value or values to the auxiliary non-volatile memory 103, to "Page A", for example, page 305, as state 300, updating the state value from state value "0" to state value "1", and recalculating and storing the redundancy check 310. In step 331, control of the data storage drive writes the state value or values to the auxiliary non-volatile memory 103, to "Page B", for example, page 306, as state value 301, updating the state value from state value "0" to state value "1", and recalculating and storing the redundancy check 311. Thus, the current status of the operation, performing the function indicated as state value "1", is redundantly stored in the auxiliary non-volatile memory 103 in verifiable form.

Step 340 determines whether the operation is complete, and, if not, upon completion of the function of state "1" and beginning of the next function returns the process to step 325. The host identifies the state value or values of the operation, for example, the current function 325 of the operation, to the data storage drive, for example by providing a "write attribute" command. In step 330, the control of the data storage drive writes the state value or values to the auxiliary non-volatile memory 103, to "Page A", for example, page 305, as state value 300, updating the state value from state value "1" to state value "2", and recalculating and storing the redundancy check 310. In step 331, control of the data storage drive writes the state value or values to the auxiliary non-volatile memory 103, to "Page B", for example, page 306, as state value 301, updating the state value from state value "1" to state value "2", and recalculating and storing the redundancy check 311. Thus, the current status of the operation, performing the function indicated as state value "2", is redundantly stored in the auxiliary non-volatile memory 103 in verifiable form.

The process continues, repeating the steps to maintain the state value indicating the current state of the operation redundantly stored in the auxiliary non-volatile memory 103 in verifiable form.

Once the operation is complete, as indicated by step 340, the rest state indicated as state value "0" is written to the auxiliary non-volatile memory 103, as shown by step 350 which returns to steps 330 and 331 to indicate that the process has returned to the rest state. In step 330, "Page A", for example, page 305, state value 300 is updated from the previous state value to state value "0", recalculating and storing the redundancy check 310. In step 331, the control of the data storage drive writes the state value to the auxiliary non-volatile memory 103, to "Page B", for example, page 306, as state 301, updating the state from the previous state value to state value "0", and recalculating and storing the redundancy check 311. Thus, the current rest state "0" is redundantly stored in the auxiliary non-volatile memory 103 in verifiable form.

If no failure occurs, the process repeats for the next operation conducted by the host system, and there is no need to read the states from the auxiliary non-volatile memory 103.

In a complex environment, it may be that no one state value alone indicates the precise state of the operation, and that a plurality of state values are used. As an example, if various aspects of the operation are conducted in parallel, the state values at the time may be "2A, 2B, 2D". Thus, the terms "state value", "state value(s)" and "at least one state value" may be interchanged based on context.

Figure 7:
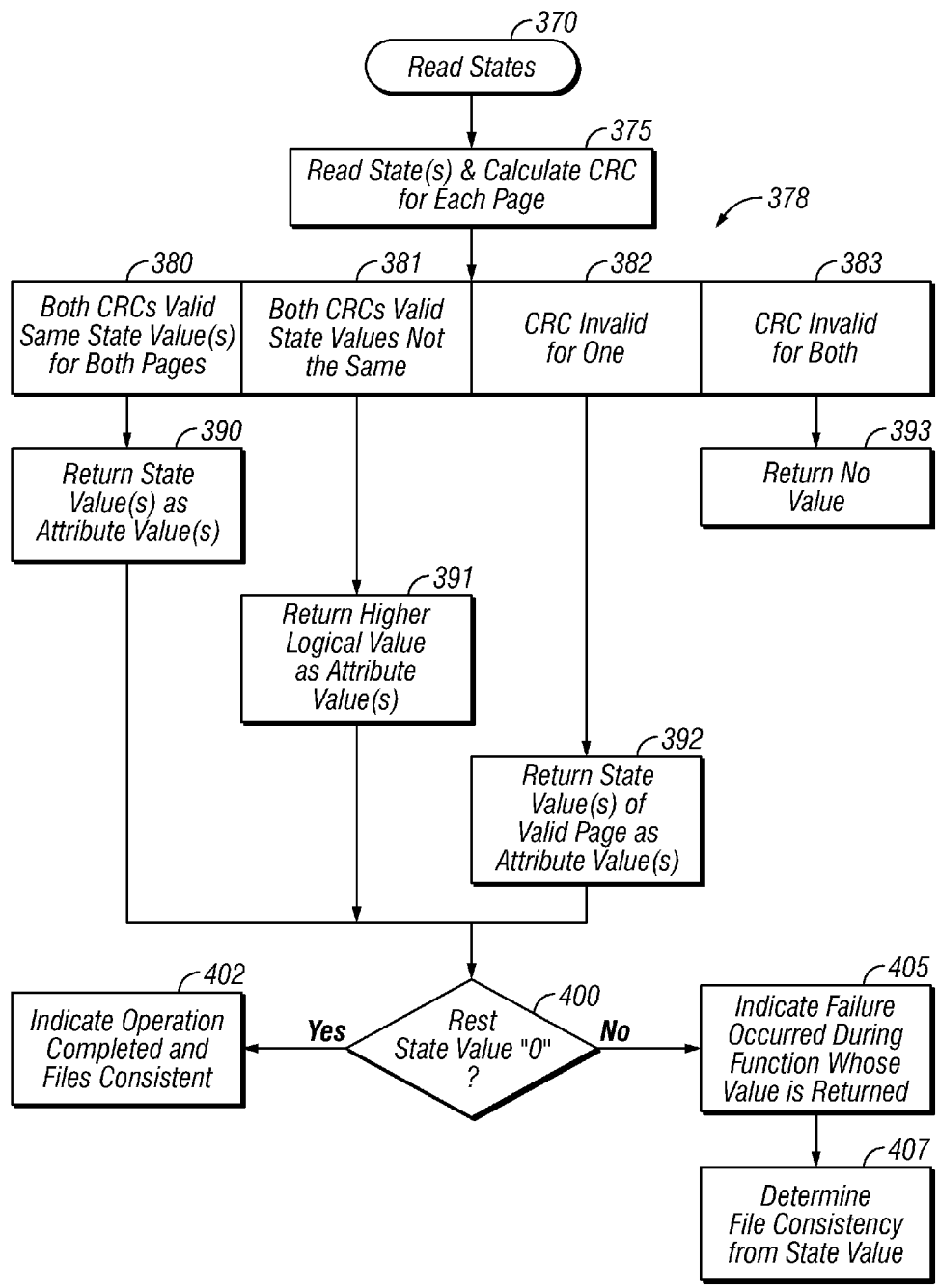
FIG. 7 is a flow chart depicting reading the states of the auxiliary non-volatile memory of FIG. 5.

Referring to FIGS. 4, 5 and 7, the states are read from the auxiliary non-volatile memory 103, beginning at step 370. The states may be read at any time, for example with a "read attribute" command with the appropriate Attribute ID. Attribute IDs are discussed above.

As one example, the state value may be read upon loading the removable data storage media, to determine the conditions under which the prior mount of the removable data storage media ended, by which the consistency of the data files can be determined. Should a failure occur, the removable data storage media 100 is likely to be moved to an operational data storage drive.

At the operational data storage drive, the auxiliary non-volatile memory 103 of the removable data storage media 100 has the information necessary to determine the effect of the failure on the data of the removable data storage media. With the redundant verifiable state value, the point of a failure of the data storage drive is easily identified, unambiguous, and is fail safe, allowing rapid determination whether the data files are consistent. The removable data storage media 100 is mounted at the operational data storage drive, and it is then necessary to read the state value. As examples, the data storage drive may return the state value to the host system, or indicate the state value at a drive display, and the host system or the data storage drive may employ the state values and indicate whether the operation was complete and the files consistent, or whether a failure occurred during a function whose state value is returned.

In step 375, the control 240 of the data storage drive reads the auxiliary non-volatile memory 103 at interface 140. The control reads state value 300 from page 305, and the redundancy check character 310. The control or host system employs the redundancy check character to verify the state value 300 that has been read. In one example, the redundancy check is recalculated and compared to the redundancy check character 310. As discussed above, in one embodiment, the redundancy check 310 is a cyclic redundancy check character calculated as known in the art with respect to the entire page 305. In another embodiment, the redundancy check comprises a check character calculated with respect to the written state value, perhaps together with a portion of other data of the page 305.

Also in step 375, the control reads state value 301 from page 306, and the redundancy check character 311. The control or host system employs the redundancy check character to verify the read state value 301. In one example, the redundancy check is recalculated and compared to the redundancy check character 311.

The results of reading the state values 300 and 301, and verifying the state values with the redundancy check characters 310 and 311 are illustrated in step 378, where the drive queries of the two pages of the auxiliary non-volatile memory 103 may encounter one of four conditions.

Condition 380 of step 378, where both the redundancy check characters 310 and 311 are valid, and the state values 300 and 301 of both pages 305 and 306 are the same, indicate that the last status of the files of the removable data storage media is that indicated by the state value(s), and the state value(s) are returned as Attribute value(s) in step 390.

In condition 381, both the redundancy check characters 310 and 311 are valid, but the state values 300 and 301 of both pages 305 and 306 are different. This could occur if a failure occurred after the first state value is updated but before the second state value is updated. Thus, step 391 returns the higher logical value of the two pages as the Attribute value(s).

For example, if the state values are "0" and "1", "1" is reported as the correct value, meaning that the data storage drive was conducting the function indicated as value "1" when the failure occurred, and that step "0" had been completed. Similarly, if the state values are "7" and "0", "0" is reported as the correct value, meaning that the data storage drive was returning to the rest state designated by value "0" when the failure occurred, and that step "7" had been completed.

Condition 382 indicates that one of the redundancy check characters 310, 311 is invalid, while the other is valid. This could occur if a failure occurred with the page 305, 306 was being written, so that the redundancy check character was not calculated and stored on the invalid page. In step 392, the state value 300, 301 having the valid redundancy check character is returned as the value when the failure occurred.

In condition 383, neither redundancy check character 310, 311 is valid. This condition indicates a failed auxiliary non-volatile memory, and no valid state value can be returned, as indicated by step 393.

Step 400 determines whether the returned state value 300, 301 is "0", indicating the rest state. In all cases of the example, including condition 391, if the returned value is the rest state "0", then the files are consistent because either there was no error or the error occurred too late to cause file inconsistency, and the operation is complete, as indicated by step 402. Any other state, as indicated by step 405, indicates that a failure occurred during the step whose value is returned.

In step 407, if the states are appropriately selected, the consistency of the data files can be determined by examining the state value.

As discussed above, in one example, an application of the host system identifies the operation as a "MAM Attribute" with a "MAM Attribute" ID, and the state value or values are stored at the auxiliary non-volatile memory as Attribute values in the data storage drive via a "Write Attribute" command specifying the appropriate "MAM Attribute" ID and Attribute value. Similarly, an application can query the state value from the auxiliary non-volatile memory via the "Read Attribute" command specifying the appropriate "MAM Attribute" ID.

The data storage drive control 240 recognizes the "MAM Attribute" ID as being that of the state value, and routes the value to, or retrieves it from, the two pages 305, 306. In response to the "Read Attribute" command, the data storage drive control 240 also checks the redundancy check character (for example, CRC) 310, 311 for validity, and determines the value, and returns the appropriate state value in the Attribute value.

An advantage of using known commands saves the need for special programming in that the value is treated as any "MAM Attribute" parameter, and no special commands are required.

Referring to FIG. 4, the invention requires dual storage of values in verifiable non-volatile storage, which may be of any suitable type, indicated herein as an auxiliary non-volatile memory 103. The auxiliary non-volatile memory 103 may comprise one or more memory entities, for example, having separate pages that are the subject of redundancy checking. Similarly, the removable data storage media 100 may be of any suitable type having both a medium 121 for storage of data, and the auxiliary non-volatile memory 103. Other examples of either the medium 121 or non-volatile memory 103 comprise semiconductor or solid state memory, a removable computer diskette, and random access memory [RAM], a read-only memory [ROM], a rigid magnetic disk and an optical disk, compact disk-read only memory [CD-ROM], compact disk-read/write [CD-R/W] and DVD.

The implementations may involve software, firmware, micro-code, hardware and/or any combination thereof. The implementation may take the form of code or logic implemented in a medium, such as control 240 where the medium may comprise hardware logic (e.g. an integrated circuit chip, Programmable Gate Array [PGA], Application Specific Integrated Circuit [ASIC], or other circuit, logic or device), and stored a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor as discussed above and be stored in a computer readable storage medium as discussed above as a computer program product that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method associated with conducting data storage operations with respect to removable data storage media having auxiliary non-volatile memory of a plurality of pages, comprising:
    writing to one page of said auxiliary non-volatile memory, at least one state value indicating the status of a data storage operation with respect to said removable data storage media, and providing a redundancy check with respect to at least said written at least one state value of said one page of said auxiliary non-volatile memory;
    writing to a second page of said auxiliary non-volatile memory, said at least one state value indicating the status of said data storage operation, and providing a redundancy check with respect to at least said written at least one state value of said second page of said auxiliary non-volatile memory;
    reading said written at least one state value of a data storage operation from said one page and from said second page of said auxiliary non-volatile memory;
    determining the validity of said redundancy check from each said page;
    comparing said at least one state value of said one page to said at least one state value of said second page; and
        if said redundancy check from each said page is valid, and said at least one state value from both said pages are the same, return said at least one state value as the valid state value;
        if said redundancy check from each said page is valid, and said at least one state value from each said page is different, return the higher logical at least one state value of said pages as the valid state value;
        if said redundancy check from a said page is valid, and said redundancy check from the other said page is invalid, return said at least one state value from said valid page as the valid state value; and
        if said redundancy check from each said page is invalid, return no valid state value.

2. The method of claim 1, wherein said state values comprise (a) a value indicating rest status, and (b) values of said data storage operation; and wherein said method additionally comprises:
    determining whether said returned valid state value indicates said rest status; and
    if so, indicating files of said removable data storage media with respect to said data storage operation are consistent;
    else, indicating an error with respect to said data storage operation.

3. The method of claim 2, additionally comprising: with said indication of said error, identifying said returned valid state value as the last completed status of said data storage operation.

4. A data storage drive comprising:
    a read and write system configured to conduct data storage operations with respect to removable data storage media;
    an auxiliary read and write system configured to read and write to an auxiliary non-volatile memory of said removable data storage media, said auxiliary non-volatile memory comprising a plurality of pages; and a control configured to:
> write to one page of said auxiliary non-volatile memory, at least one state value indicating the status of a data storage operation with respect to said removable data storage media, and provide a redundancy check with respect to at least said written at least one state value of said one page of said auxiliary non-volatile memory;
> write to a second page of said auxiliary non-volatile memory, said at least one state value indicating the status of said data storage operation, and provide a redundancy check with respect to at least said written at least one state value of said second page of said auxiliary non-volatile memory;
> read said written at least one state value of a data storage operation from said one page and from said second page of said auxiliary non-volatile memory;
> determine the validity of said redundancy check from each said page;
> compare said at least one state value of said one page to said at least one state value of said second page; and
>> if said redundancy check from each said page is valid, and said at least one state value from both said pages are the same, return said at least one state value as the valid state value;
>> if said redundancy check from each said page is valid, and said at least one state value from each said page is different, return the higher logical at least one state value of said pages as the valid state value;
>> if said redundancy check from a said page is valid, and said redundancy check from the other said page is invalid, return said at least one state value from said valid page as the valid state value; and
>> if said redundancy check from each said page is invalid, return no valid state value.

5. The data storage drive of claim 4, wherein said state values comprise (a) a value indicating rest status, and (b) other values of said data storage operation; and wherein said control is additionally configured to:
> determine whether said returned valid state value indicates said rest status; and
> if so, indicate files of said removable data storage media with respect to said data storage operation are consistent;
> else, indicate an error with respect to said data storage operation.

6. The data storage drive of claim 5, wherein said control is additionally configured to: with said indication of said error, identify said returned valid state value as the last completed status of said data storage operation.

7. A computer program product comprising a non-transient computer usable medium storing a computer readable program when executed on at least one computer processor of a control of a data storage drive, said control associated with conducting data storage operations with respect to removable data storage media having auxiliary non-volatile memory of a plurality of pages; configured to cause said control to operate said data storage drive:
> to write to one page of said auxiliary non-volatile memory, at least one state value indicating the status of a data storage operation with respect to said removable data storage media, and to provide a redundancy check with respect to at least said written at least one state value of said one page of said auxiliary non-volatile memory;
> to write to a second page of said auxiliary non-volatile memory, said at least one state value indicating the status of said data storage operation, and to provide a redundancy check with respect to at least said written at least one state value of said second page of said auxiliary non-volatile memory;
> to read said written at least one state value of a data storage operation from said one page and from said second page of said auxiliary non-volatile memory;
> to determine the validity of said redundancy check from each said page;
> to compare said at least one state value of said one page to said at least one state value of said second page; and
>> if said redundancy check from each said page is valid, and said at least one state value from both said pages are the same, to return said at least one state value as the valid state value;
>> if said redundancy check from each said page is valid, and said at least one state value from each said page is different, to return the higher logical at least one state value of said pages as the valid state value;
>> if said redundancy check from a said page is valid, and said redundancy check from the other said page is invalid, to return said at least one state value from said valid page as the valid state value; and
>> if said redundancy check from each said page is invalid, to return no valid state value.

8. The computer program product of claim 7, wherein said state values comprise (a) a value indicating rest status, and (b) other values of said data storage operation; and wherein said computer program product is additionally configured to cause said control to operate said data storage drive:
> to determine whether said returned valid state value indicates said rest status; and
> if so, to indicate files of said removable data storage media with respect to said data storage operation are consistent;
> else, to indicate an error with respect to said data storage operation.

9. The computer program product of claim 8, additionally configured to cause said control to operate said data storage drive: with said indication of said error, to identify said returned valid state value as the last completed status of said data storage operation.

* * * * *